United States Patent
Shirali et al.

(10) Patent No.: US 9,848,735 B2
(45) Date of Patent: Dec. 26, 2017

(54) HIGH EFFICIENCY COMMERCIAL FRYER

(71) Applicants: Manouchehr Shirali, Richmond, IN (US); Shawn Scott, Mount Prospect, IL (US); Ainan Bao, Des Plaines, IL (US); Paul Glanville, Chicago, IL (US); Stephen L. Wilks, Trotwood, OH (US)

(72) Inventors: Manouchehr Shirali, Richmond, IN (US); Shawn Scott, Mount Prospect, IL (US); Ainan Bao, Des Plaines, IL (US); Paul Glanville, Chicago, IL (US); Stephen L. Wilks, Trotwood, OH (US)

(73) Assignees: Henny Penny Corporation, Eaton, OH (US); Utilization Technology Development NFP, Des Plaines, IL (US)

( * ) Notice: Subject to any disclaimer, the term of this patent is extended or adjusted under 35 U.S.C. 154(b) by 89 days.

(21) Appl. No.: 14/645,963

(22) Filed: Mar. 12, 2015

(65) Prior Publication Data

US 2016/0262571 A1    Sep. 15, 2016

(51) Int. Cl.
*A47J 37/12*   (2006.01)
*A23L 1/01*    (2006.01)
*A23D 9/00*    (2006.01)

(52) U.S. Cl.
CPC ........... *A47J 37/1247* (2013.01); *A23D 9/00* (2013.01); *A23L 1/0107* (2013.01); *A47J 37/1233* (2013.01); *A47J 37/1242* (2013.01)

(58) Field of Classification Search
CPC .... A47J 27/026; A47J 27/024; A47J 37/1247; A47J 37/1242

USPC ................... 99/403; 126/391.1, 378.1, 390.1
See application file for complete search history.

(56) References Cited

U.S. PATENT DOCUMENTS

| | | | | |
|---|---|---|---|---|
| 2,452,472 A | * | 10/1948 | Keating | A47J 37/1247 126/391.1 |
| 3,769,959 A | * | 11/1973 | Parker | F28F 13/12 126/91 R |
| 4,848,318 A | * | 7/1989 | Brewer | F23D 14/34 126/343.5 R |
| 4,928,664 A | * | 5/1990 | Nishino | F23C 15/00 126/391.1 |

(Continued)

FOREIGN PATENT DOCUMENTS

| | | |
|---|---|---|
| JP | 2003-275105 A | 9/2003 |
| JP | 2009-240542 A | 10/2009 |

*Primary Examiner* — Reginald L Alexander
(74) *Attorney, Agent, or Firm* — Pauley Erickson & Kottis

(57) ABSTRACT

A fryer unit combination includes a frying fluid vat and an associated heat exchange system whereby increased or greater efficiencies and/or heat transfers can be obtained and realized. The heat exchange system includes a first heat exchanger arrangement at least in part disposed within the frying fluid vat and a second heat exchanger arrangement disposed externally to the frying fluid vat. In the first heat exchanger arrangement, a heat exchange tube is in heat flow communication with a combustion chamber wherein an associated gaseous fuel burner is at least in part housed. The second heat exchanger arrangement includes at least a first side heat exchanger disposed externally adjacent the first side of the frying fluid vat. The side heat exchanger(s) may permit intake of an oxygen-containing gas such to preheat the oxygen-containing gas prior to entrance into the combustion chamber.

19 Claims, 9 Drawing Sheets

(56) References Cited

U.S. PATENT DOCUMENTS

| | | | | |
|---|---|---|---|---|
| 5,050,582 A | * | 9/1991 | Almond | ............... F23M 9/00 |
| | | | | 126/374.1 |
| 5,101,558 A | * | 4/1992 | Grob | .................. F23D 14/14 |
| | | | | 29/527.2 |
| 6,736,130 B2 | | 5/2004 | Takahashi | |
| 2009/0084272 A1 | | 4/2009 | Chikazawa et al. | |
| 2011/0048248 A1 | * | 3/2011 | Manson | ............ A47J 37/1247 |
| | | | | 99/403 |

* cited by examiner though such commercial fryers may serve to increase efficiency and heat transfer as compared to standard fryers, fryers that provide or result in greater efficiencies and/or increased heat transfers are sought and desired.

HIGH EFFICIENCY COMMERCIAL FRYER

BACKGROUND OF THE INVENTION

Field of the Invention

This invention relates generally to fryers such as used in food preparation and, more particularly, to commercial fryers with increased cooking efficiency.

Discussion of Related Art

Common commercial fryers generally provide a cooking efficiency in a range of 50-55%.

In an effort to increase heat transfer and efficiency, commercial fryers that utilize a power burner design in combination with a heat exchanger have been developed. While such commercial fryers may serve to increase efficiency and heat transfer as compared to standard fryers, fryers that provide or result in greater efficiencies and/or increased heat transfers are sought and desired.

SUMMARY OF THE INVENTION

A general object of the invention is to provide an improved commercial fryer.

A more specific objective of the invention is to overcome one or more of the problems described above.

One aspect of the invention relates to a fryer unit combination. In accordance with one embodiment, such a fryer unit combination includes a frying fluid vat and a heat exchange system in association with the frying fluid vat. The frying fluid vat includes an open top, a bottom side, opposed front and back ends, and opposed first and second sides. The heat exchange system includes a first heat exchanger arrangement at least in part disposed within the frying fluid vat and a second heat exchanger arrangement disposed externally to the frying fluid vat. The first heat exchanger arrangement includes a heat exchange tube in heat flow communication with a combustion chamber wherein an associated gaseous fuel burner is at least in part housed. The combustion chamber includes first and second side discharge openings and at least one end discharge opening. The heat exchange tube is in heat exchange heated fluid communication with the first and second side and at least one end discharge openings of the combustion chamber. The heat exchange tube arrangement includes at least one heated fluid outlet positioned toward the front end of the vat. The second heat exchanger arrangement includes at least a first side heat exchanger disposed externally adjacent the first side of the frying fluid vat.

A fryer unit combination in accordance with another embodiment of the invention includes a frying fluid vat having an open top, a bottom side, opposed front and back ends, and opposed first and second sides. The fryer unit combination further includes a heat exchange system in association with the frying fluid vat. Such a heat exchange system may desirably include a first heat exchanger arrangement at least in part disposed within the frying fluid vat. The first heat exchanger arrangement includes a heat exchange tube in heat flow communication with a combustion chamber. An associated gaseous fuel burner is at least in part housed within the combustion chamber. An oxygen-containing gas and a gaseous fuel are burned within the combustion chamber to form an elevated temperature flue gas. The combustion chamber has first and second side discharge openings and at least one end discharge opening. The heat exchange tube is in heat exchange heated fluid communication with the first and second side and at least one end discharge openings of the combustion chamber. The heat exchange tube arrangement includes at least one heated fluid outlet that is desirably positioned toward the front end of the vat.

The heat exchange system further desirably includes a second heat exchanger arrangement disposed externally to the frying fluid vat. The second heat exchanger arrangement includes at least a first side heat exchanger disposed externally adjacent the first side of the frying fluid vat and a second side heat exchanger disposed externally adjacent the second side of the frying fluid vat.

The second heat exchanger arrangement is desirably interconnected with the first heat exchanger arrangement so that a first portion of heated fluid from the first heat exchanger arrangement passes into at least the first side heat exchanger and a second portion of heated fluid from the first heat exchanger arrangement passes into at least the second side heat exchanger.

In accordance with another aspect of the invention, a new method of operating a fryer unit having a heat exchange system in association with a frying fluid vat is provided. The heat exchange system includes a first heat exchanger arrangement at least in part disposed within the frying fluid vat and a second heat exchanger arrangement disposed externally to the frying fluid vat. The first heat exchanger arrangement includes a heat exchange tube in heat flow communication with a combustion chamber wherein an associated gaseous fuel burner is at least in part housed and wherein an oxygen-containing gas and a gaseous fuel are burned to form an elevated temperature flue gas. The combustion chamber includes first and second side discharge openings and at least one end discharge opening. The heat exchange tube is in heat exchange heated fluid communication with the first and second side and at least one end discharge openings of the combustion chamber. The heat exchange tube arrangement includes at least one heated fluid outlet positioned toward the front end of the vat. The second heat exchanger arrangement includes at least a first side heat exchanger disposed externally adjacent the first side of the frying fluid vat.

In one embodiment, the method involves:

taking in of an oxygen-containing gas through intake openings in the first side heat exchanger;

passing the intaken oxygen-containing gas in heat transfer communication with at least a portion of the elevated temperature flue gas to preheat the oxygen-containing gas prior to entrance in the combustion chamber;

passing the preheated oxygen-containing gas to the combustion chamber;

burning the air preheated oxygen-containing gas and gaseous fuel to form an elevated temperature flue gas; and circulating the elevated temperature flue gas through the heat exchange tube to heat frying fluid in the frying fluid vat.

Other objects and advantages will be apparent to those skilled in the art from the following detailed description taken in conjunction with the appended claims and drawings.

BRIEF DESCRIPTION OF THE DRAWINGS

FIG. 6' is a top view of a heat exchanger arrangement in accordance with another embodiment of the invention.

DETAILED DESCRIPTION OF THE INVENTION

The present invention provides improved fryer apparatus and, more particularly, improved fryer apparatus for commercial applications whereby increased or greater efficiencies and/or heat transfers can be obtained and realized.

Figure 1:
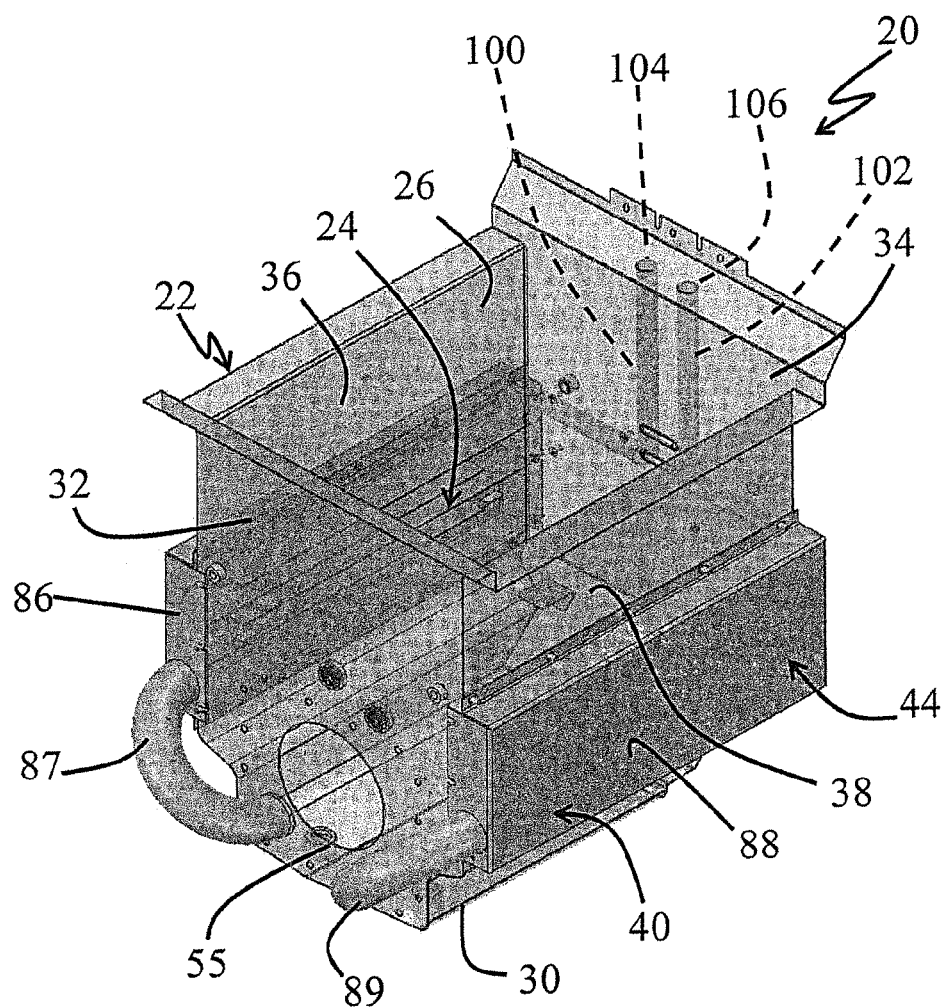
FIG. 1 is a simplified partially in see-through perspective view of a fryer apparatus in accordance with one embodiment of the invention.
Figure 2:
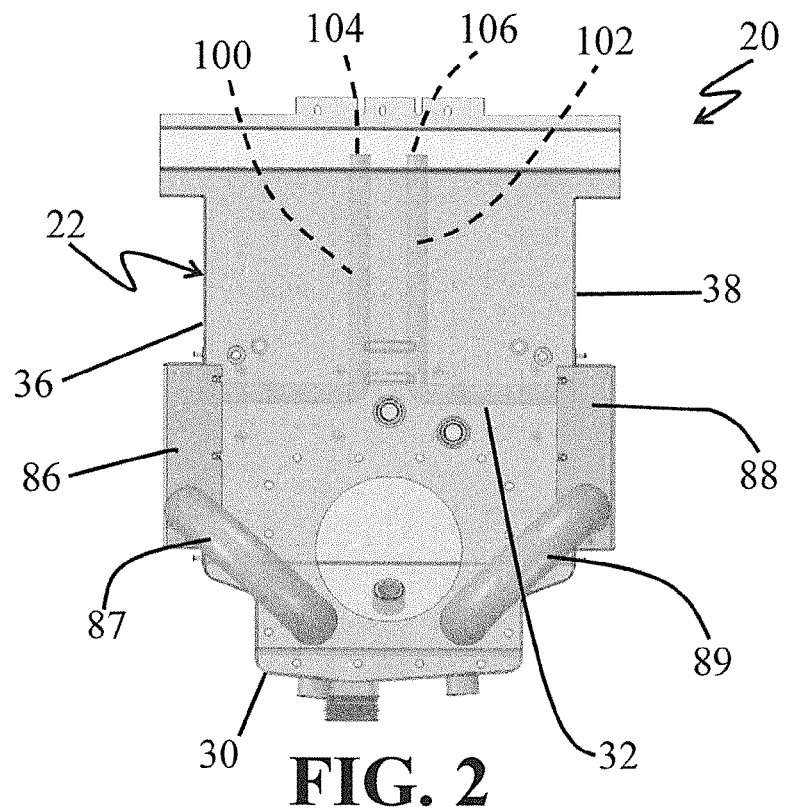
FIGS. 2 and 3 are front and back views, respectively, of the fryer apparatus shown in FIG. 1.
Figure 3:
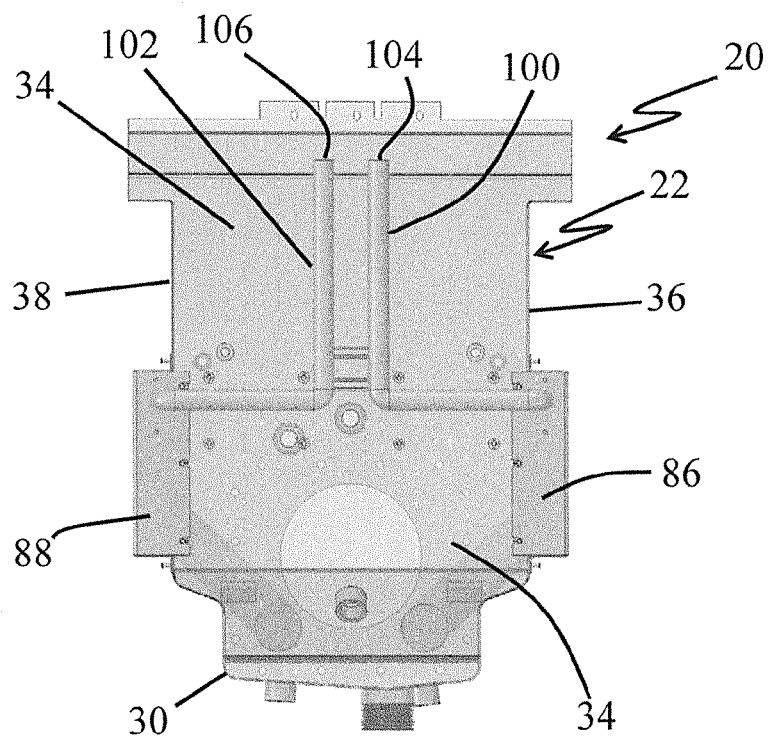
Figure 4:
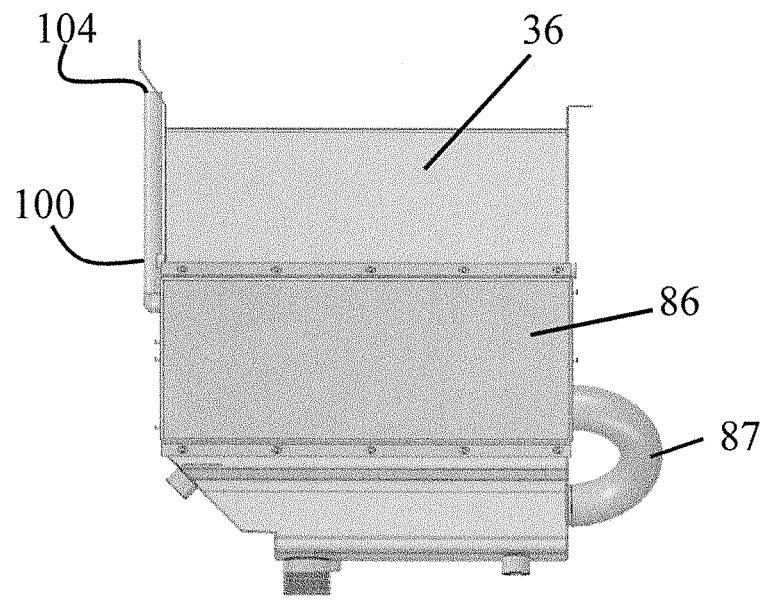
FIG. 4 is a side view of the fryer apparatus shown in FIG. 1.

FIGS. 1-3 show a fryer apparatus, generally designated by the reference numeral 20, in accordance with one embodiment of the invention. The fryer apparatus 20 is generally composed of a fryer housing 22 containing or including a fryer vat 24 having an open top 26, a bottom side 30, opposed front and back ends, 32 and 34, respectively, and opposed first and second lateral sides, 36 and 38, respectively. The vat 24 may be suitably made or formed of various materials such as are known in the art including, for example, stainless steel or aluminum such as in sheet metal form such as appropriately shaped, formed and welded.

The fryer apparatus 20 also includes a heat exchange system, generally designated by the reference numeral 40, for use in association with the frying fluid vat 24 such as to at least in part serve to heat a cooking oil contained within the fryer vat 24.

Figure 6:
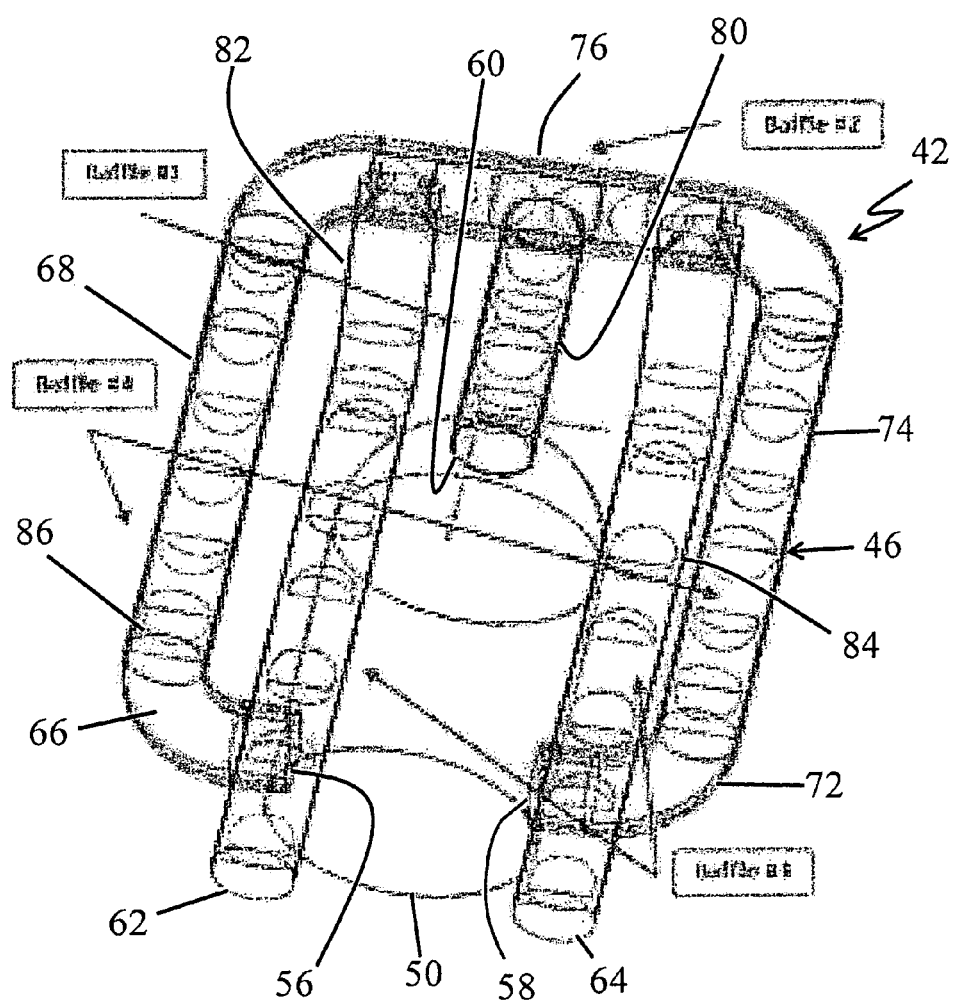
FIG. 6 is a top view of a heat exchanger arrangement in accordance with one embodiment of the invention and for placement at least in part within a frying fluid vat of a fryer apparatus in accordance with one embodiment of the invention.
Figure 6:
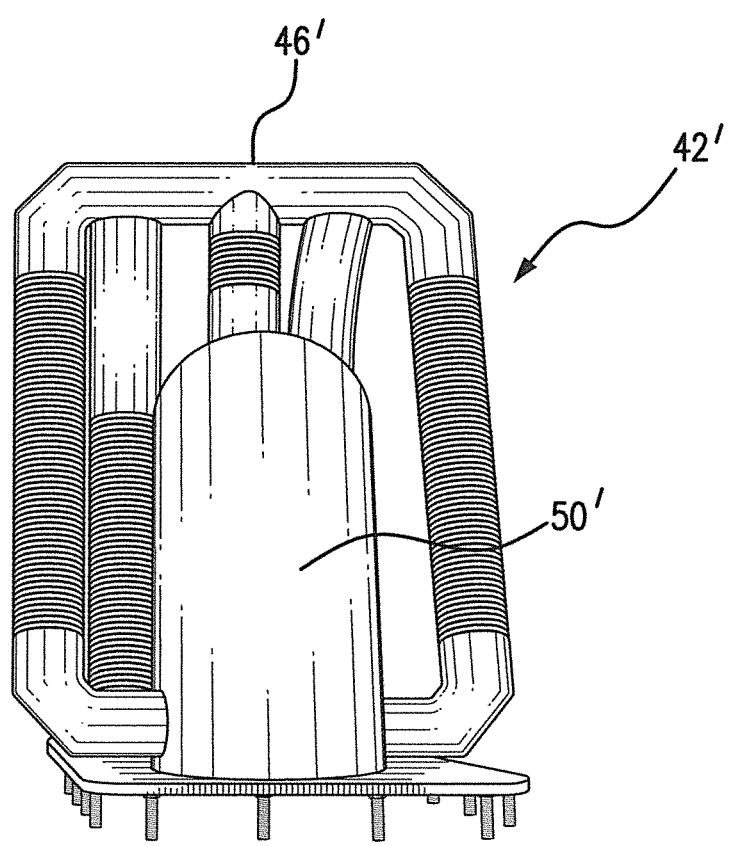

The heat exchange system 40 includes a specifically designed and constructed first heat exchanger arrangement 42, schematically shown in isolation in FIG. 6, and adapted for placement in and for use in association with the frying fluid vat 24 and a second heat exchanger arrangement 44, disposed externally to the frying fluid vat 24.

Figure 7:
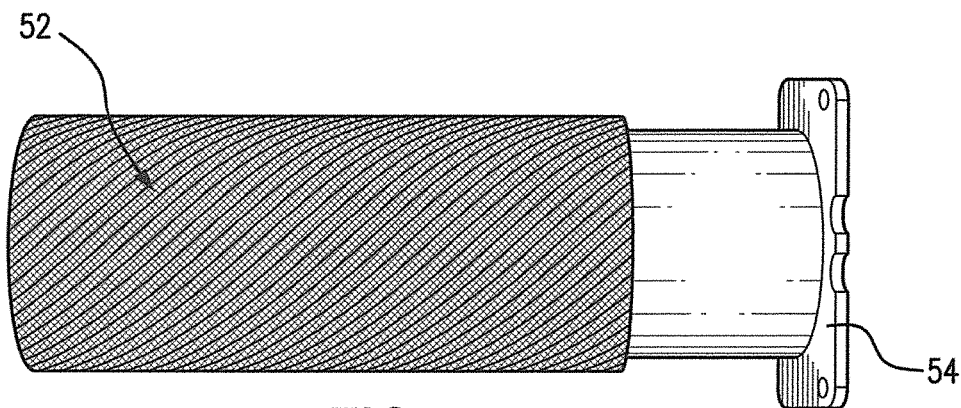
FIG. 7 is a perspective view of a gaseous fuel burner for use in conjunction with the heat exchanger arrangement shown in FIG. 6.

The first heat exchanger arrangement 42 includes a heat exchange tube 46, such as at least in part and preferably completely or near completely, immersed in cooking oil contained within the fryer vat 24. As shown, the heat exchange tube 46 desirably is in heat flow communication with a combustion chamber 50. Within the combustion chamber 50, an associated gaseous fuel burner 52, such as shown in FIG. 7, is at least in part housed. Typically, a gaseous fuel and an oxygen-containing gas are burned in the combustion chamber 50 to form a flue gas. Suitable gaseous fuel materials include, but are not necessarily limited to, natural gas, methane, propane and the like. Suitable oxygen-containing gases include, but are not necessarily limited to air, oxygen, oxygen-enriched air and the like.

The burner 52 includes or has an associated mount structure 54 for mounting the gaseous fuel burner in place. As shown in FIG. 1, the front side or end 32 of the fryer housing 22 includes an opening 55 for mounting the gaseous fuel burner in place.

In the specifically designed and constructed first heat exchanger arrangement 42 shown in FIG. 6, the combustion chamber 50 includes first and second side discharge openings, 56 and 58, and at least one end discharge opening 60. The heat exchange tube 46 is in heat exchange heated fluid communication with the at least one end discharge opening 60 and the first and second side discharge openings 56 and 58 of the combustion chamber 50. As shown, the heat exchange tube 46 includes at least one and, in the illustrated embodiment two, heated fluid outlets 62 and 64 such as can desirably be situated or positioned at or toward the front end 32 of the vat 24.

In the embodiment shown in FIG. 6, the heat exchange tube 46 forms a circuit connecting the end discharge opening 60, the first side discharge opening 56 and the second side discharge opening 58 with the outlets 62 and 64. More specifically, the heat exchange tube 46 includes a first side flow turn elbow 66 joined to a first side lateral section 68 and a second side flow turn elbow 72 joined to a second side lateral section 74. The first and second side lateral sections 68 and 74 are joined to heat exchange tube end section 76. A connection section 80 joins or connects the end discharge opening 60 with the heat exchange tube end section 76. The heat exchange tube 46 includes outlet sections 82 and 84 respectively joining the heat exchange tube end section 76 with the fluid outlets 62 and 64.

While such a heat exchange tube can be designed or formed to have an aspect ratio of one, those skilled in the art and guided by the teachings herein provided will understand and appreciate that the invention, if desired, can be practiced employing a heat exchange tube having an aspect ratio greater than one such as to appropriately alter the heat transfer effected therewith.

Moreover, if desired, such a heat exchange tube or selected portions thereof can be designed or formed to have one or more enhanced heat transfer surface feature such as selected from the group consisting of a corrugated tube section, an internal fin, an external fin and a plurality of surface dimples or the like, for example.

FIG. 6' shows a first heat exchanger arrangement 42' that includes a heat exchange tube 46' in heat flow communication with a combustion chamber 50'. While the first heat exchanger arrangement 42' is generally similar to the first heat exchanger arrangement 42 shown in FIG. 6 and described above, the heat exchange tube 46' differs in that it at least in part is composed of a corrugated tube section. As will be appreciated, the inclusion and use of such a corrugated sections can desirably enhance or otherwise alter heat transfer by or via such a tube.

Furthermore, as shown in FIG. 6, one or more sections or portions of the heat exchange tube 46 can include features such as baffles 86 such as to increase, improve or otherwise enhance heat transfer from the combustion products flowing therethrough. For example, in the embodiment shown in FIG. 6 baffles are show in the first side lateral section 68, the second side lateral section 74, the end section 76, the connections section 80, and the outlet sections 82 and 84.

Returning to FIG. 1, the second heat exchanger arrangement 44 includes at least a first side heat exchanger 86 in gas flow communication, such as via a connection section 87, with the outlet 62 of the heat exchange tube 46 shown in FIG. 6. The first side heat exchanger 86 is disposed externally adjacent the first side 36 of the frying fluid vat 24. In the illustrated embodiment, the second heat exchanger arrangement 44 also includes a second side heat exchanger 88. The second side heat exchanger 88 is disposed externally adjacent the second side 38 of the frying fluid vat 24. The second side heat exchanger 88 is in gas flow communication, such as via a connection section 89, with the outlet 64 of the heat exchange tube 46 shown in FIG. 6.

Figure 5:
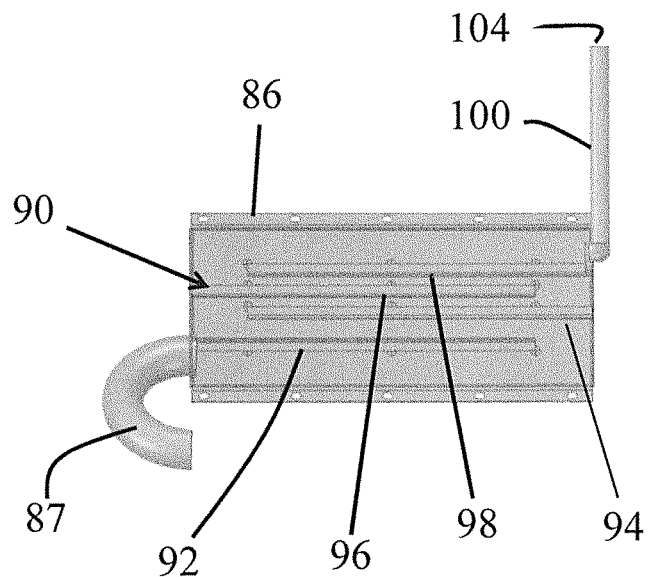
FIG. 5 is a fryer-facing side view showing a side heat exchanger of the fryer apparatus shown in FIG. 1.

In the subject illustrated embodiment, each of the first and second side heat exchangers 86 and 88 includes baffling 90 such as having the form of alternating horizontal runs 92, 94, 96, and 98 (shown in FIG. 5) such as to form a convoluted flow path for passage of the flue gas produced by the burner within the combustion chamber as such flue gas passes through the side heat exchangers on passage out of the heat exchange system 40 via the conduits 100 and 102 to the back end flue gas outlets 104 and 106.

While the invention has been described making reference to specifically designed and constructed first and second heat exchanger arrangements, the broader practice of the invention is not necessarily so limited as those skilled in the art and guided by the teachings herein provided will understand and appreciate various modifications can be made and/or alternatives employed in of as heat exchanger designs for either or both the first and second heat exchanger arrangements in an effort to desirably enhance or improve capture or utilization of heat from the flue gases prior to release from the system.

The combustion gases, upon passage through the side heat exchangers 36 and 38 are subsequently passed via the conduits 100 and 102 to the back end flue gas outlets 104 and 106 for subsequent treatment, discharge, release, or exhaust, as may be desired.

Those skilled in the art and guided by the teachings herein provided will understand and appreciate that while the secondary use of the flue gas in such a second heat exchanger arrangement such as in the side heat exchangers can desirably serve to reduce or minimize oil jacket heat loss, the flue outlet temperature will generally be limited to the oil temperature, e.g., about 300-350° F.

Turning to FIGS. 8-11, there is illustrated a fryer apparatus, generally designated by the reference numeral 220, in accordance with another embodiment of the invention wherein preheating of oxidizer/air is desirably integrated into the apparatus.

The fryer apparatus 220 is in many respect similar to the fryer apparatus 20 described above and is generally composed of a fryer housing 222 containing or including a fryer vat 224 having an open top 226, a bottom side 230, opposed front and back ends, 232 and 234, respectively, and opposed first and second lateral sides, 236 and 238, respectively.

The fryer apparatus 220, similar to the fryer apparatus 20 also includes a heat exchange system, generally designated by the reference numeral 240, for use in association with the frying fluid vat 224. As described in greater detail below, the heat exchange system 240 has been modified such that in addition to at least in part serving to heat cooking oil contained within the fryer vat 224, the heat exchange system additionally desirably serves to preheat combustion oxidizer/air entering into the unit.

The heat exchange system 240 includes a first heat exchanger arrangement, the same or similar to the first heat exchanger arrangement 42 described above with reference to FIG. 6 and not here specifically described in further detail.

As described above, such a first heat exchanger arrangement is adapted for placement in and for use in association with the frying fluid vat.

The heat exchange system 240, similar to the heat exchange system 40 described above, also includes a second heat exchanger arrangement 244 which is disposed externally to the frying fluid vat 224.

The second heat exchanger arrangement 244 includes at least a first side heat exchanger 286 in gas flow communication with the outlet 62 of the first heat exchanger arrangement (shown in FIG. 6) such as via a connection section 287. The first side heat exchanger 286 is disposed externally adjacent the first side 236 of the frying fluid vat 224. In the illustrated embodiment, the second heat exchanger arrangement 244 also includes a second side heat exchanger 288. The second side heat exchanger 288 is in gas flow communication with the outlet 64 of the first heat exchanger arrangement (shown in FIG. 6) such as via a connection section 289 and is disposed externally adjacent the second side 238 of the frying fluid vat 224.

Each of the first and second side heat exchangers 286 and 288 includes baffling 290 such as having the form of alternating horizontal runs 292, 294, 296, 298, and 299 such as to form a convoluted flow path for passage of the flue gas produced by the burner within the combustion chamber as such flue gas passes through the side heat exchangers on passage out of the heat exchange system 40 via conduits 300 and 302 to back end flue gas outlets 304 and 306.

Figure 10:
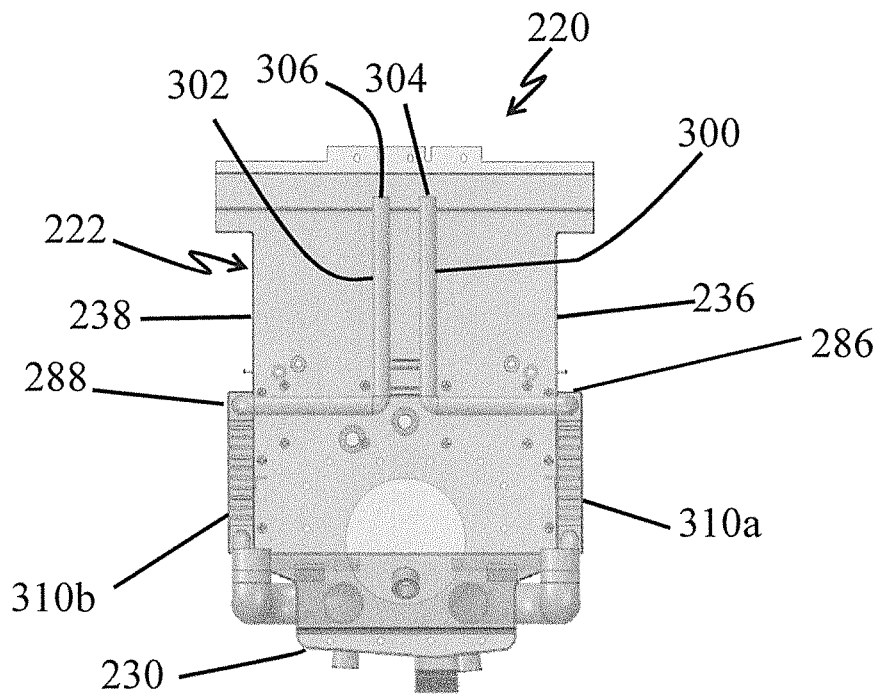

In the subject illustrated embodiment, each of the first and second side heat exchangers 286 and 288 have been modified to incorporate oxidizer/air intakes 310a and 310b, respectively and as perhaps best viewed by reference to FIG. 10, wherethrough oxidizer/air can be drawn into the respective side heat exchanger and passed through conduits 312, 314, 316, and 318 such as in an alternating placement with runs of baffling 290 and in heat flow communication with the combustions gases passed through the side heat exchanger so as to desirably preheat the oxidizer/air. The preheated oxidizer/air from each of the conduits flows into header 320a and 320b and subsequently is passed via conduits 322a and 322b ultimately to the combustion chamber.

With such integration of the preheating of the combustion oxidizer/air, the oxidizer/air can desirably be preheated to or near the oil temperature. Thus, such an apparatus or system can desirably provide a higher efficiency than the apparatus or system 20 described above. Further the temperature of the flue outlet products will generally be at a temperature between that of the oil and ambient conditions.

Figure 8:
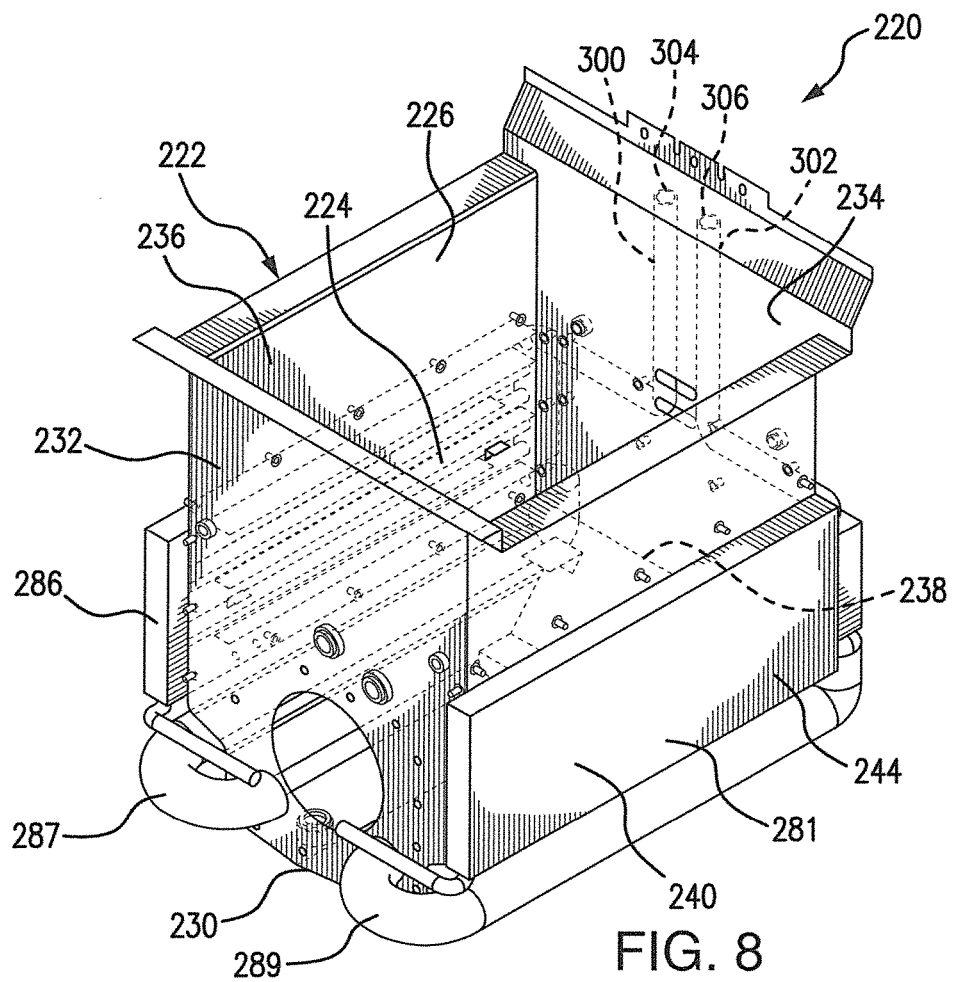
FIG. 8, similar to FIG. 1, is a simplified partially in see-through perspective view of a fryer apparatus but now in accordance with another embodiment of the invention.
Figure 9:
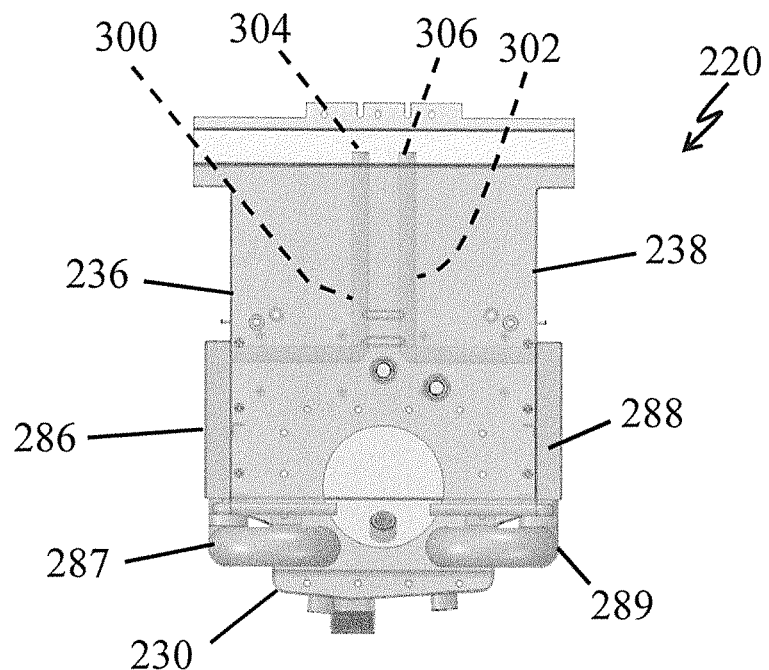
FIGS. 9 and 10 are front and back views, respectively, of the fryer apparatus shown in FIG. 8.
Figure 11:
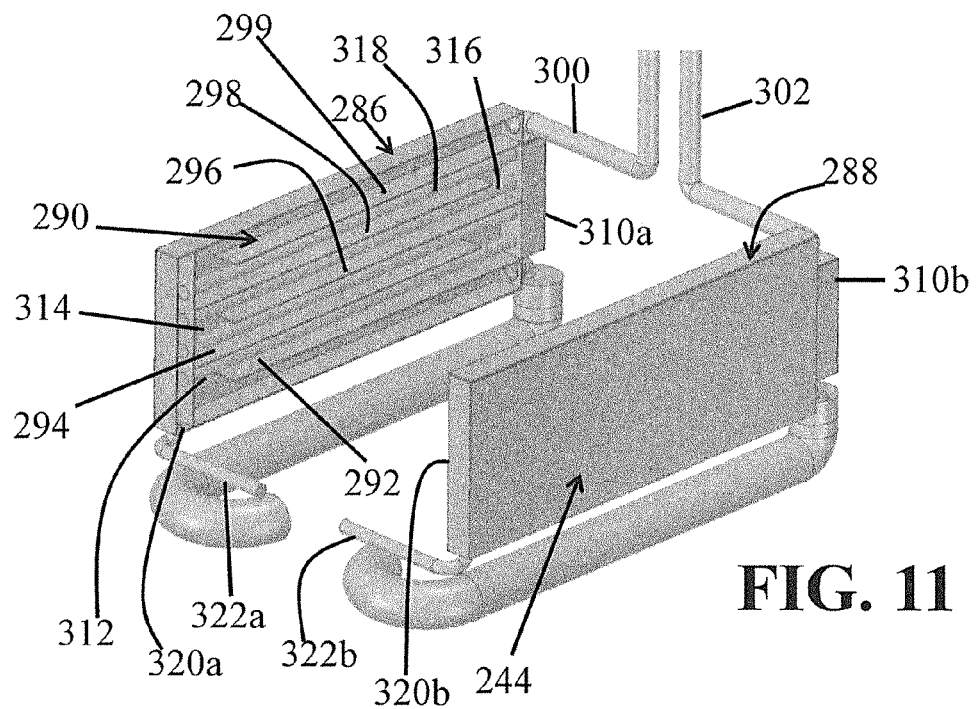
FIG. 11 is an enlarged perspective view of the fryer apparatus shown FIG. 8, without showing the fryer vat itself.
Figure 12:
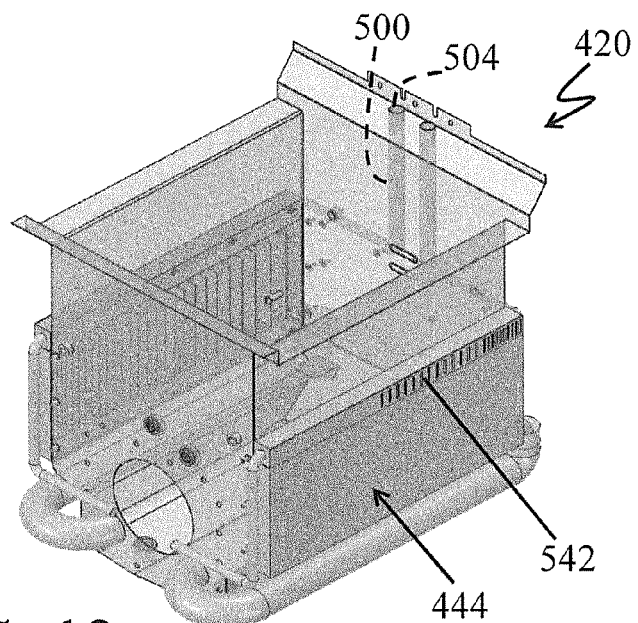
FIG. 12 is similar to FIG. 8 but now showing a partially in see-through perspective view of a fryer apparatus in accordance with another embodiment of the invention.
Figure 13:
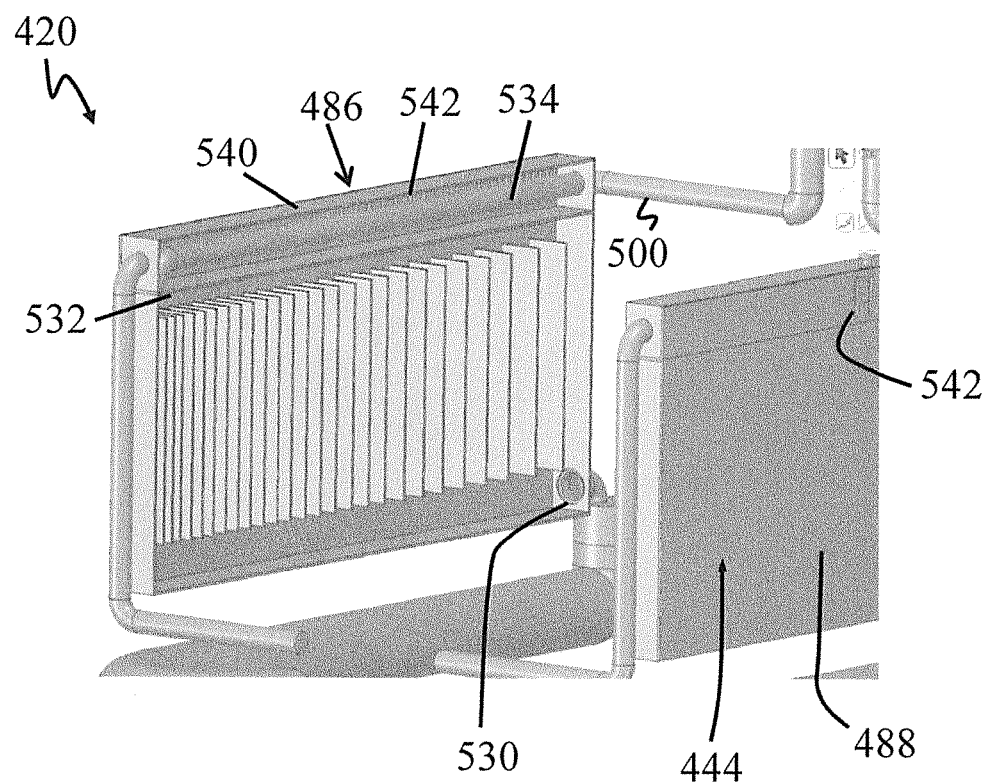
FIG. 13 is similar to FIG. 11 but now showing a perspective view of the fryer apparatus shown FIG. 12, without showing the fryer vat itself.

FIGS. 12 and 13 are similar to FIGS. 8 and 11 but now showing a fryer apparatus 420, similar to the fryer apparatus 220 described above, but having a second heat exchanger arrangement 444 modified in accordance with another embodiment of the invention to provide for preheating oxidizer/air prior to entry into the combustion chamber.

The second heat exchanger arrangement 444 will be described in greater detail generally making specific reference to the side heat exchanger 486. As will be appreciated, the side heat exchanger 488, if included, can have a similar or different design as may be desired.

The side heat exchanger 486 has been modified to incorporate a plurality of vertical baffles 490 such that combustion products passing into the side heat exchanger via the entrance 530 are passed through the side heat exchanger via the vertical baffles and collected via an outlet 532 and passed through a conduit 534 to a conduit 500 and ultimately to the back end flue gas outlet 504.

The side heat exchanger 486 includes an upper heat transfer compartment 540, wherein oxidizer/air brought into the compartment such as via entry slots 542 is passed in heat transfer communication with the combustion products in the conduit 534 such as to preheat the oxidizer/air prior to entry into the combustion chamber of the first heat exchanger arrangement, such as shown in FIG. 6.

While selected aspects of the invention have been described above with reference to specific apparatus, it is to be appreciated that additional aspects of the invention pertain to methods and techniques such as relating to the operation of such or other fryer apparatus.

For example, a new method of operating a fryer unit having a heat exchange system in association with a frying fluid vat has been developed. The heat exchange system includes a first heat exchanger arrangement at least in part disposed within the frying fluid vat and a second heat exchanger arrangement disposed externally to the frying fluid vat. The first heat exchanger arrangement includes a heat exchange tube in heat flow communication with a combustion chamber wherein an associated gaseous fuel burner is at least in part housed and wherein an oxygen-containing gas and a gaseous fuel are burned to form an elevated temperature flue gas. The combustion chamber includes first and second side discharge openings and at least one end discharge opening. The heat exchange tube is in heat exchange heated fluid communication with the first and second side and at least one end discharge openings of the combustion chamber. The heat exchange tube arrangement includes at least one heated fluid outlet positioned toward the front end of the vat. The second heat exchanger arrangement includes at least a first side heat exchanger disposed externally adjacent the first side of the frying fluid vat.

In one embodiment, the method involves:

taking in of an oxygen-containing gas through intake openings in the first side heat exchanger;

passing the intaken oxygen-containing gas in heat transfer communication with at least a portion of the elevated temperature flue gas to preheat the oxygen-containing gas prior to entrance in the combustion chamber;

passing the preheated oxygen-containing gas to the combustion chamber;

burning the air preheated oxygen-containing gas and gaseous fuel to form an elevated temperature flue gas; and circulating the elevated temperature flue gas through the heat exchange tube to heat frying fluid in the frying fluid vat.

Thus the invention desirably provides improved fryer apparatus and methods for fryers and their operation and, more particularly, improved fryer apparatus and methods for commercial applications whereby increased or greater efficiencies and/or heat transfers can be obtained and realized.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A fryer unit combination, the combination comprising:
   a frying fluid vat having an open top, a bottom side, opposed front and back ends, and opposed first and second sides, and
   a heat exchange system in association with the frying fluid vat, the heat exchange system including:
      a first heat exchanger arrangement at least in part disposed within the frying fluid vat, the first heat exchanger arrangement including a heat exchange tube in heat flow communication with a combustion chamber wherein an associated gaseous fuel burner is at least in part housed, the combustion chamber including opposed front and back ends, opposed first and second sides with the first side having a first side discharge opening and the second side having a second side discharge opening and the combustion chamber also including at least one third end discharge opening disposed at the combustion chamber front or back end the heat exchange tube in heat exchange heated fluid communication with the first and second side and at least one third end discharge openings of the combustion chamber, the heat exchange tube arrangement including at least one heated fluid outlet positioned toward the front end of the vat, and
      a second heat exchanger arrangement disposed externally to the frying fluid vat, the second heat exchanger arrangement including at least a first side heat exchanger disposed externally adjacent the first side of the frying fluid vat.

2. The fryer unit combination of claim 1 wherein a gaseous fuel and an oxygen-containing gas are burned in the combustion chamber to form a flue gas.

3. The fryer unit combination of claim 2 wherein the oxygen-containing gas comprises air.

4. The fryer unit combination of claim 2 wherein a portion of the flue gas is recirculated to the combustion chamber.

5. The fryer unit combination of claim 1 wherein the heat exchange tube includes a plurality of straight length sections containing heat transfer baffles.

6. The fryer unit combination of claim 1 wherein at least a portion of the heat exchange tube comprises at least one enhanced heat transfer surface feature selected from the group consisting of a corrugated tube section, an internal fin, an external fin and a plurality of surface dimples.

7. The fryer unit combination of claim 1 wherein the heat exchange tube also includes a second heated fluid outlet positioned toward the front end of the vat.

8. The fryer unit combination of claim 1 wherein the first side heat exchanger includes a heated fluid outlet positioned toward the back end of the vat.

9. The fryer unit combination of claim 1 wherein the second heat exchanger arrangement is interconnected with the first heat exchanger arrangement so that at least a first portion of heated fluid from the first heat exchanger arrangement passes into at least the first side heat exchanger.

10. The fryer unit combination of claim 1 wherein the second heat exchanger arrangement additionally comprises a second side heat exchanger disposed externally adjacent the second side of the frying fluid vat.

11. The fryer unit combination of claim 10 wherein at least a second portion of heated fluid from the first heat exchanger arrangement passes into at least the second side heat exchanger.

12. The fryer unit combination of claim 10 wherein the first and second side heat exchangers each include a heated fluid outlet positioned toward the back end of the vat.

13. The fryer unit combination of claim 1 wherein at least a portion of the heat exchange tube has an aspect ratio greater than one.

14. A fryer unit combination, the combination comprising:
a frying fluid vat having an open top, a bottom side, opposed front and back ends, and opposed first and second sides, and
a heat exchange system in association with the frying fluid vat, the heat exchange system including:
a first heat exchanger arrangement at least in part disposed within the frying fluid vat, the first heat exchanger arrangement including a heat exchange tube in heat flow communication with a combustion chamber wherein an associated gaseous fuel burner is at least in part housed, the combustion chamber including first and second side discharge openings and at least one end discharge opening, the heat exchange tube in heat exchange heated fluid communication with the first and second side and at least one end discharge openings of the combustion chamber, the heat exchange tube arrangement including at least one heated fluid outlet positioned toward the front end of the vat, and
a second heat exchanger arrangement disposed externally to the frying fluid vat, the second heat exchanger arrangement including at least a first side heat exchanger disposed externally adjacent the first side of the frying fluid vat;
wherein the second heat exchanger arrangement includes a gas intake to permit intake of an oxygen-containing gas and wherein the intake oxygen-containing gas passes in heat transfer communication with the heated fluid to preheat the oxygen-containing gas prior to entrance into the combustion chamber.

15. A method of operating a fryer unit combination of claim 14, the method comprising:
taking in of an oxygen-containing gas through intake openings in the first side heat exchanger;
passing the intaken oxygen-containing gas in heat transfer communication with at least a portion of an elevated temperature flue gas to preheat the oxygen-containing gas prior to entrance in the combustion chamber;
passing the preheated oxygen-containing gas to the combustion chamber;
burning the air preheated oxygen-containing gas and gaseous fuel to form an elevated temperature flue gas; and
circulating the elevated temperature flue gas through the heat exchange tube to heat frying fluid in the frying fluid vat.

16. A fryer unit combination, the combination comprising:
a frying fluid vat having an open top, a bottom side, opposed front and back ends, and opposed first and second sides, and
a heat exchange system in association with the frying fluid vat, the heat exchange system including:
a first heat exchanger arrangement at least in part disposed within the frying fluid vat, the first heat exchanger arrangement including a heat exchange tube in heat flow communication with a combustion chamber wherein an associated gaseous fuel burner is at least in part housed, the combustion chamber including first and second side discharge openings and at least one end discharge opening, the heat exchange tube in heat exchange heated fluid communication with the first and second side and at least one end discharge openings of the combustion chamber, the heat exchange tube arrangement including at least one heated fluid outlet positioned toward the front end of the vat, and
a second heat exchanger arrangement disposed externally to the frying fluid vat, the second heat exchanger arrangement including at least a first side heat exchanger disposed externally adjacent the first side of the frying fluid vat,
wherein the second heat exchanger arrangement additionally comprises a second side heat exchanger disposed externally adjacent the second side of the frying fluid vat and
wherein at least one of the first and second side heat exchangers includes a gas intake to permit intake of an oxygen-containing gas and wherein the intake oxygen-containing gas passes in heat transfer communication with the heated fluid to preheat the oxygen-containing gas prior to entrance into the combustion chamber.

17. The fryer unit combination of claim 16 wherein each of the first and second side heat exchangers includes a gas intake to permit intake of an oxygen-containing gas and wherein the intake oxygen-containing gas passes in heat transfer communication with the heated fluid to preheat the oxygen-containing gas prior to entrance into the combustion chamber.

18. A fryer unit combination, the combination comprising:
a frying fluid vat having an open top, a bottom side, opposed front and back ends, and opposed first and second sides, and
a heat exchange system in association with the frying fluid vat, the heat exchange system including:
a first heat exchanger arrangement at least in part disposed within the frying fluid vat, the first heat exchanger arrangement including a heat exchange tube in heat flow communication with a combustion chamber wherein an associated gaseous fuel burner is at least in part housed and wherein an oxygen-containing gas and a gaseous fuel are burned to form an elevated temperature flue gas, the combustion chamber including opposed front and back ends, opposed first and second sides with the first side having a first side discharge opening and the second side having a second side discharge opening and the combustion chamber also including at least one third end discharge opening disposed at the combustion chamber front or back end, the heat exchange tube in heat exchange heated fluid communication with the first and second side and at least one third end discharge openings of the combustion chamber, the heat exchange tube arrangement including at least one heated fluid outlet positioned toward the front end of the vat, and
a second heat exchanger arrangement disposed externally to the frying fluid vat, the second heat exchanger arrangement including at least a first side heat exchanger disposed externally adjacent the first side of the frying fluid vat and a second side heat exchanger disposed externally adjacent the second side of the frying fluid vat,
wherein the second heat exchanger arrangement is interconnected with the first heat exchanger arrangement so that a first portion of heated fluid from the first heat exchanger arrangement passes into at least the first side heat exchanger and a second portion of heated fluid from the first heat exchanger arrangement passes into at least the second side heat exchanger.

19. A fryer unit combination, the combination comprising:
- a frying fluid vat having an open top, a bottom side, opposed front and back ends, and opposed first and second sides, and
- a heat exchange system in association with the frying fluid vat, the heat exchange system including:
  - a first heat exchanger arrangement at least in part disposed within the frying fluid vat, the first heat exchanger arrangement including a heat exchange tube in heat flow communication with a combustion chamber wherein an associated gaseous fuel burner is at least in part housed and wherein an oxygen-containing gas and a gaseous fuel are burned to form an elevated temperature flue gas, the combustion chamber including first and second side discharge openings and at least one end discharge opening, the heat exchange tube in heat exchange heated fluid communication with the first and second side and at least one end discharge openings of the combustion chamber, the heat exchange tube arrangement including at least one heated fluid outlet positioned toward the front end of the vat, and
  - a second heat exchanger arrangement disposed externally to the frying fluid vat, the second heat exchanger arrangement including at least a first side heat exchanger disposed externally adjacent the first side of the frying fluid vat and a second side heat exchanger disposed externally adjacent the second side of the frying fluid vat,
- wherein the second heat exchanger arrangement is interconnected with the first heat exchanger arrangement so that a first portion of heated fluid from the first heat exchanger arrangement passes into at least the first side heat exchanger and a second portion of heated fluid from the first heat exchanger arrangement passes into at least the second side heat exchanger, and
- wherein at least one of the first and second side heat exchangers includes a gas intake to permit intake of an oxygen-containing gas and wherein the intake oxygen-containing gas passes in heat transfer communication with the heated fluid to preheat the oxygen-containing gas prior to entrance into the combustion chamber.

* * * * *